Patented Nov. 29, 1932

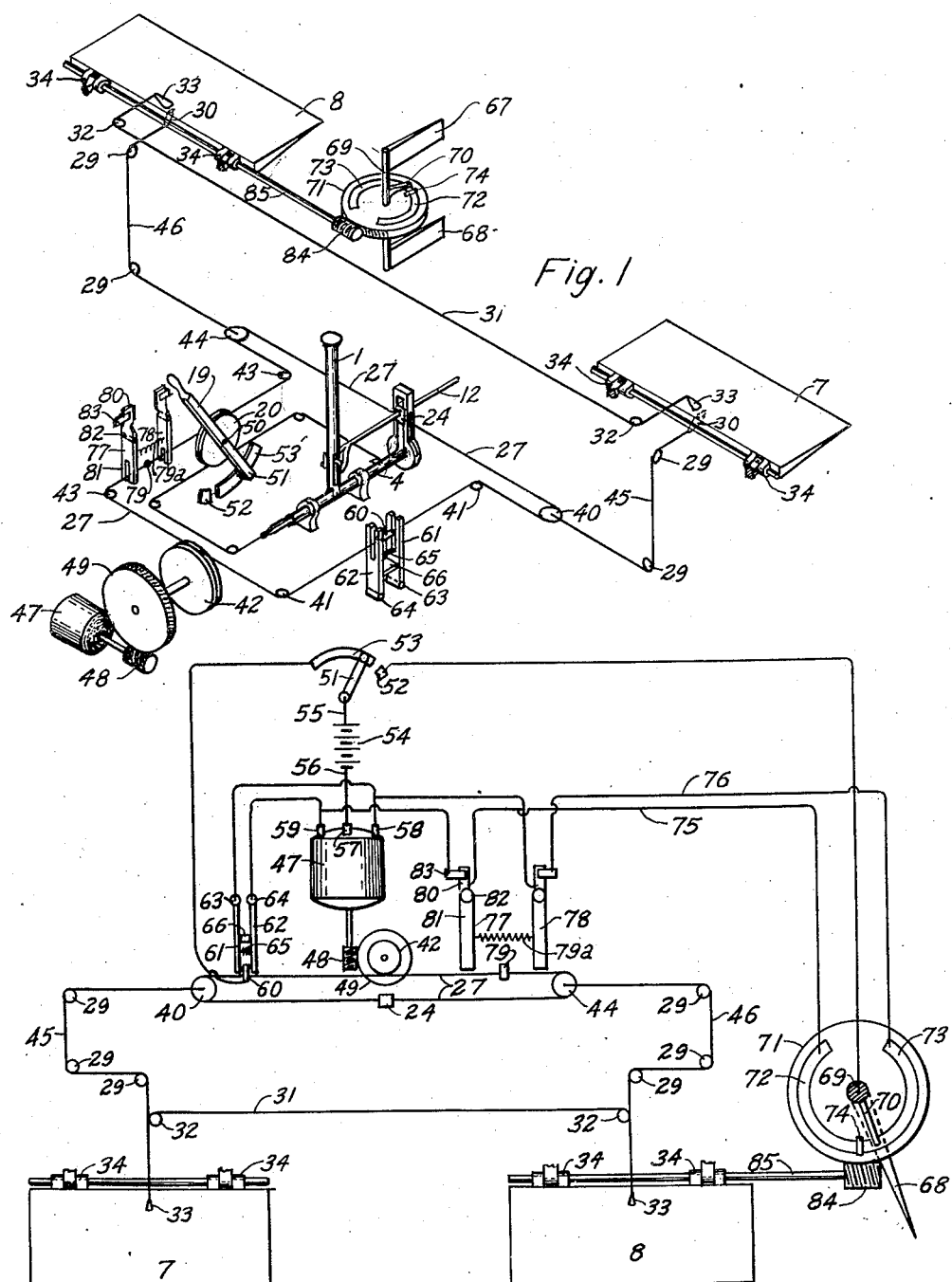

1,889,273

UNITED STATES PATENT OFFICE

HAROLD T. AVERY, OF OAKLAND, CALIFORNIA

AUTOMATIC BANKING CONTROL

Application filed August 24, 1927. Serial No. 215,126.

This invention relates to a device capable of automatically controlling the lateral banking of a vertically dirigible vehicle in a manner adapted to eliminate side-slip of the vehicle with respect to the medium in which it is moving. It is particularly applicable to the control of airplanes and other aircraft.

The objects of this invention are:

1. The provision in aircraft of means for automatically controlling the rotation of the craft about its longitudinal axis.

2. The provision of a device which, used in conjunction with means for automatically controlling the rotations of the vehicle about its other two co-ordinate axes, will give complete automatic control of the craft, and permit of more sudden changes of course, and more extensive maneuvering of the craft under automatic control than would otherwise be possible.

3. In such a device provision for maximum smoothness of operation including means adapted to rotate the craft in a direction to eliminate side-slip at a rate approximately proportional to the amount of side-slip.

4. In such a device the provision of means for limiting the operation of the banking mechanism to a safe working range.

5. In such a device the provision of means for automatically leaving all battery circuits open when the vehicle is not operating.

6. The provision of means for automatically controlling the banking of an airplane without interfering with the direct control thereof.

7. The provision of means for automatically rendering the automatic bank control operative whenever the means for directly controlling the banking is inoperative, and vice versa.

8. The provision of means for automatically bringing the automatic bank control into its neutral position when the direct control is operative.

Other objects and advantages will hereinafter appear.

In addition to the above novel results, several constructional features of the invention will be apparent from the following specification and claims. The invention consists in the novel combination of parts as hereinafter set forth.

The general principles of the invention and the relation of parts in a preferred embodiment of the invention as applied to aircraft, with particular reference to airplanes, is described in the following specification and illustrated in the accompanying drawing. The broad scope of the invention is particularly set forth in the appended claims.

In the drawing:

Fig. 1 is a perspective view of my preferred embodiment as installed in an airplane. The view is looking downward from the left front, and all parts not concerned with bank control have been omitted.

Fig. 2 is a diagrammatic representation of the electrical circuits and other essential parts pertaining thereto.

The device consists primarily of a vane so supported as to be displaced by the sideslipping of the vehicle on which it is mounted in a direction and amount governed by the direction and amount of the side-slip, and of mechanism connecting the vane to the ailerons (or other means employed to produce banking of the vehicle) in a manner adapted to cause the proper amount of banking of the vehicle to eliminate side-slip.

The accompanying drawing illustrates the banking control device installed on an airplane equipped with mechanism similar in general to that covered by my copending application for airplane control, No. 132,686, filed August 31, 1926, which mechanism is adapted, among other things, to lock the aileron control in its neutral position. This mechanism includes means by which moving lever 19 toward the rear lowers the connection of rod 12 to the control-stick 1, and lowers block 24 to which aileron wire 27 is attached, so that as lever 19 is brought into its extreme rearward position the points of attachment of wire 27 to block 24 will be opposite the axis of sleeve 4, thus preventing movements of the control-stick from being transmitted to the ailerons.

In adapting this apparatus to my present device, I arrange wire 27 so that instead of extending directly to the ailerons, it passes from block 24 around movable pulley 40, thence around fixed pulleys 41 to drum 42, around which it is passed and to which it is fastened in such a manner that the rotation of the drum will move the wire. Leaving drum 42, wire 27 passes around fixed pulleys 43, movable pulley 44, and thence to block 24. With this arrangement, so long as drum 42 remains fixed in its neutral position, and lever 19 in a position adapted to give direct control of the ailerons, lateral movement of control-stick 1 will move laterally the portion of wire 27 attached to block 24, and will cause pulleys 40 and 44 to move laterally in a direction corresponding to the movement of wire 27, and by an amount half as great. Pulley 40 is attached to wire 45, which extends over suitable guide pulleys 29 to projection 30 which extends downward from left aileron 7, while pulley 44 is similarly connected by wire 46 to right aileron 8. By properly adjusting the distance of block 24 from the axis of sleeve 4 any desired ratio of movement may be set up between control-stick 1 and wires 45 and 46. Thus with lever 19 in a forward position and drum 42 fixed, the response of ailerons 7 and 8 to control-stick 1 is exactly similar to that ordinarily existing.

With lever 19 moved back into the position that holds the points of attachment of wire 27 to block 24 fixed in neutral the ailerons may be controlled by the rotation of drum 42, which will then cause similar movements of pulleys 40 and 44. The operation of drum 42 is accomplished by means of motor 47 which drives worm 48, meshing with worm gear 49 which is rigid with drum 42.

The movement of lever 19 rotates disc 20 on its pivot 50. In my present device I provide a contact arm 51 rigid with disc 20, and so arranged that when lever 19 is in its rearmost position, which serves to lock the hand control, arm 51 contacts with plate 52, while in all other positions of the lever it contacts with plate 53. Motor 47 is operated by battery 54 which is connected by means of wire 55 to contact arm 51, and by means of wire 56 to connection 57 on motor 47. The motor also has two other connections 58 and 59, so arranged that current entering at connection 58 will cause the motor to rotate in a direction adapted to feed wire 27 to the right, thereby lowering left aileron 7, raising right aileron 8, and tending to cause the craft to bank to the right, while current entering at connection 59 will cause the reverse rotation and movements.

Rigidly attached to wire 27 between drum 42 and movable pulley 40 is contact bumper 60, so arranged that it occupies the space between contact arms 61 and 62 when drum 42 brings the portion of wire 27 to which it is attached into its neutral position. Contact arms 61 and 62 are pivotally mounted on axes 63 and 64 respectively, and are pulled toward each other by spring 65, but held at proper minimum clearance by spreader 66. Thus contact bumper 60 does not contact with either arm so long as the portion of wire 27 operated by drum 42 is in its neutral position, but any displacement of that portion of the wire to the left will bring it into contact with arm 61, while any displacement to the right of its neutral position will bring bumper 60 into contact with arm 62, and each of these contacts will be maintained until the wire reaches its neutral position. Bumper 60 is electrically connected to plate 53, so that it is electrically energized by battery 54 whenever lever 19 is in a position to allow of the ailerons being directly controlled by the movements of control-stick 1, and is disconnected when lever 19 is in a position to render direct control inoperative. Contact arms 61 and 62 are electrically connected to motor connections 58 and 59 respectively. The arrangement is therefore such that as soon as lever 19 is moved into a position which renders direct control operative the contacts made by bumper 60 serve to bring the portion of wire 27 attached to drum 42 into its neutral position and to return it to such position if displaced therefrom.

To automatically control the banking I provide vanes 67 and 68 rigidly attached to vertical axis 69 which is supported so as to be freely rotatable. Axis 69 may be arranged to extend vertically through a wing of the airplane, with vane 67 freely rotatable above the wing, and vane 68 below the wing. Rigidly attached to axis 69 at a point intermediate between the two vanes is contact arm 70, which is arranged to move over the face of disc 71 as axis 69 moves rotatably with respect to said disc. On the face of the disc are two contact plates 72 and 73 separated by insulation strip 74, and so arranged that arm 70 will contact with plate 72 or 73 as it moves respectively to the left or right of the position occupied by insulation strip 74.

Vanes 67 and 68 being supported on a freely rotatable axis will align themselves, throughout the motion of the plane, with the air stream, which will be directly toward the rear if there is no side-slip, and angularly displaced to the left or right thereof if there is any side-slip. Disc 71 is normally so placed that arm 70 will contact will insulation strip 74 when the vanes stand directly to the rear. Any side-slip to the right will cause the vanes to move to the left and arm 70 to contact with plate 72, while any side-slip in the opposite direction will bring it into contact with plate 73. Arm 70 is electrically connected to plate 52, thereby being electrically energized by battery 54 whenever lever 19 is moved into the position which renders direct control of the ailerons inoperative.

Plates 72 and 73 are respectively connected electrically to motor connections 59 and 58, by means of wires 75 and 76, respectively. Thus whenever lever 19 is moved into the position in which it renders inoperative the direct control of the ailerons by control-stick 1, the automatic bank control is put into operation actuating motor 47 and drum 42 in such a manner that whenever there is any side-slip to the right, drum 42 will feed wire 27 to the left banking the machine toward the left, while any side-slip in the opposite direction will have the opposite effect.

In order to keep the operation of the ailerons and aileron control means within a safe working range during automatic control, I provide cut-out switches 77 and 78 in wires 75 and 76, respectively, so arranged that bumper 79, rigid with wire 27 will open the live switch as either limit of the operating range is reached. Switch 77 consists of knife 80 rigid with arm 81, rotatably supported on pivot 82, and normally in contact with blades 83. Arm 81 is so positioned that if current remains on connection 59 of motor 47 long enough to bring wire 27 to the left limit of its working range it will be engaged by bumper 79 and rotated on its axis in such a manner as to separate knife 80 from blades 83 thereby opening the circuit through wire 75 and preventing further movement of wire 27 to the left. Switch 78 is arranged to open the circuit through wire 76 in an exactly similar manner when the right limit is reached. At all other times spring 79a holds both switches closed.

Provision is made for automatically leaving all battery circuits open when the craft is idle, in that if the craft is left with arm 51 in contact with plate 53 the motor will be operated in the manner previously described so as to leave bumper 60 at a position intermediate between arms 61 and 62, thereby leaving the circuit open at bumper 60, while if arm 51 is left in contact with plate 52 and arm 70 is in contact with either plate 72 or 73, the motor will continue to move wire 27 in one direction until cut-out switch 77 or 78, respectively, is opened, when it will come to rest with all circuits open.

While the apparatus as thus far described serves to move the ailerons, whenever any side-slipping is present, in a direction adapted to eliminate the side-slipping, it does not serve to return the ailerons to their neutral position as the proper angle of bank is reached, such return only taking place as the proper angle of bank is passed and side-slipping in the opposite direction commenced. Thus it has a tendency to keep the airplane oscillating back and forth across the proper angle of bank with no tendency to settle down onto the proper angle. I provide for overcoming this oscillating tendency and for operating the ailerons in a manner adapted to make the airplane settle smoothly onto the proper angle of bank, by introducing into the control apparatus an automatic correction which I choose to term an "aileron-position correction".

To accomplish this a portion of the circumference of disc 71 is shaped as a worm gear meshing with worm 84, which in turn is rigid with shaft 85, which passes through the center of hinges 34 of aileron 8, and is rigid with the aileron. Thus any movement of aileron 8 on its hinges causes an angular displacement of disc 71, the arrangement being such that raising the aileron causes a counter-clockwise rotation of the disc, while lowering it causes a clockwise rotation. Therefore, whenever contact arm 70 is displaced from neutral and causes a displacement of the ailerons, the resulting aileron displacement will cause insulation strip 74 to be displaced in the direction of the displacement of arm 70 which caused the aileron movement. During this sequence of operations the displacement of the ailerons will act to produce a banking effect adapted to reduce the side-slip, but before the side-slip has been reduced to zero, the further displacement of the ailerons will be stopped due to insulation strip 74 having moved over to meet arm 70. Since the displacement of insulation strip 74 is always proportional to that of aileron 8, and the displacement of contact arm 70 equal to the angular value of the side-slip, the displacement of the ailerons will be proportional to the side-slip actually existing at the instant that contact arm 70 and insulation strip 74 come into coincidence, and the displacement of the ailerons is halted. The aileron displacement then existing will continue to increase the angle of bank in a manner adapted to further reduce the side-slip, and as this takes place contact arm 70 will pass across insulation strip 74 onto the opposite contact plate and start returning the ailerons toward their neutral position.

Throughout the return of the ailerons to their neutral position, the angular displacement of insulation strip 74 will be maintained substantially equal to that of contact arm 70, since any movement of the arm off of strip 74 in either direction will make a contact adapted to bring about a movement of the ailerons that will result in moving strip 74 back under arm 70. The displacement of strip 74 being proportional to the displacement of the ailerons from their neutral position, and the displacement of arm 70 being equal to the angular value of the side-slip, it follows that during the return of the ailerons their displacement from the neutral position will be proportional to the angular value of the side-slip, and that the rate of change of banking will gradually decrease as the proper angle of bank is approached, and will become zero just as the side-slip disappears, thus smoothly bringing the craft onto the proper angle of bank and holding it there, until the conditions affecting the side-slip again change.

The mode of operation of the automatic banking control will be briefly summarized:

When the pilot desires to directly control the ailerons, lever 19 is moved forward into the position which gives the desired leverage ratio. This brings arm 51 into contact with plate 53, thereby energizing bumper 60 and actuating motor 47 through contact arms 61 and 62 in a manner adapted to bring the portion of wire 27 actuated by drum 42 into its neutral position and maintain it there, thus bringing the ailerons under the direct and sole control of controlstick 1.

When the pilot desires to fly the airplane under automatic control, lever 19 is moved into its rearmost position, thereby locking in its neutral position the portion of wire 27 actuated by the control-stick as described in my copending application No. 132,686 above referred to. This movement of lever 19 brings arm 51 into contact with plate 52 thereby energizing contact arm 70, and actuating motor 47 through the selective contact of this arm with plates 72 and 73. Arm 70, being rigidly attached to the same freely rotatable vertical axis as vanes 67 and 68 which are arranged to align themselves with the air stream, is displaced by any side-slip in the direction away from which the slip is taking place, and makes the selective contact adapted to move the ailerons in the direction adapted to eliminate the side-slip. This movement of the ailerons causes an angular displacement of disc 71 about axis 69 in the direction in which arm 70 has been displaced, thereby serving to arrest the displacement of the ailerons when it has reached a value proportional to the side-slip then existing, and to return them to neutral in proportion to the reduction in side-slip. Further protection against the possibility of motor 47 bringing the ailerons up against the limit of their practicable working range and possibly damaging the apparatus is provided by the introduction of cut-out switches 77 and 78 automatically operated by the movement of wire 27. Thus, so long as lever 19 is left in its rearmost position, the ailerons will be automatically operated by the selective contact of arm 70 with plates 72 and 73 in a manner adapted to smoothly bank the craft so as to eliminate side-slip, no matter what its state of motion.

The greatest usefulness of this device will be realized by using it in conjunction with an automatic steering device such as that covered by my copending application No. 200,630, filed June 22, 1927, and with an altitude control device such as that covered by my copending application No. 209,061, filed July 28, 1927. These two devices controlling the rotations of the craft about its vertical and transverse axes, respectively, and my present device controlling the rotations about the longitudinal axis, the combination of the three devices results in complete automatic control of the craft. While airplanes are frequently built with a great enough degree of inherent stability laterally to permit of their being automatically operated on comparatively straight away flying with the ailerons locked in neutral, and without automatic bank control, the use of the automatic bank control permits of much greater use of the rudder, a quickness of response of the craft to changes of course and of course corrections, and a general maneuverability under automatic control not otherwise possible.

What I claim is:

1. In a vehicle adapted to move through a fluid medium, the combination of means adapted to rotate the vehicle about its longitudinal axis, a vane adapted to automatically align itself parallel to the lines of fluid flow with respect to it and mechanism actuated by said vane and operating upon said first mentioned means in a manner adapted to eliminate lateral motion of the vehicle with respect to the medium.

2. In aircraft the combination of a vane rotatably supported upon a vertical axis and adapted to automatically align itself parallel to the airstream, means adapted to bank the craft, mechanism actuated by the vane and operating upon said means in a manner adapted to bank the craft toward the side toward which the vane is displaced.

3. In aircraft the combination of a vane rotatable on a vertical axis to automatically align itself with the air stream, means adapted to bank the craft, two contact plates the respective energizing of which serves to actuate said means, one in one direction and the other in the other, an electrically energized contact arm positioned by the above mentioned vane so as to selectively contact with the two contact plates and automatically control the banking.

4. In a dirigible vehicle the combination of means adapted to control rotary movements of the vehicle, and mechanism adapted to selectively actuate said means by the movement of either of two actuators, the other actuator remaining stationary, said mechanism including two cords each fastened to the two actuators on opposite sides thereof, and each passing over a movable pulley between the two actuators.

5. In a vehicle the combination of means adapted to directly control the rotary movements of the vehicle with respect to its longitudinal axis, a movable member adapted to be selectively operated at the option of the operator to either render said means operative or to restrain it in neutral, means adapted to automatically control the same movements of the vehicle, mechanism adapted to render said last named means automatically operative when the movable member is moved into the position adapted to restrain said first named means in neutral, said mechanism including an electrically energized member actuated by the movable member, and a member electrically connected to the automatic control means and so positioned as to contact with the electrically energized member when the first mentioned movable member is in the position adapted to restrain the first named means in neutral.

6. In an airplane the combination of ailerons, wires controlling the operation of same, a sleeve manually rotated by the pilot to actuate said wires, means adapted to vary the distance of the points of attachment of the wire from the axis of the sleeve and correspondingly vary the amount of movement transmitted to the ailerons, means adapted to automatically actuate the ailerons, and means adapted to automatically put said means into operation when the points of attachment of the aileron wires are brought into line with the axis of the sleeve, said means including an electrical contact automatically brought about by the movement of the member adapted to position the aileron wires with respect to the sleeve.

7. In a vehicle, the combination of manual means and of automatic means for effecting rotation of the vehicle about its longitudinal axis, a selector adapted to be selectively positioned to render either means operative and the other means inoperative, mechanism adapted to bring the automatic means to neutral when the manual means is rendered operative, including an electrically energized member so positioned by the selector when the manual means is rendered operative as to close a circuit energizing a movable member positioned by the movement of the automatic means in such a manner that when said means is out of neutral in either direction said movable member will close a circuit adapted to move the means in the opposite direction.

8. In aircraft the combination of means for effecting rotary movements of the craft adapted to be actuated selectively by either manual means or automatic means, a movable member adapted to render the manual means inoperative when placed in one position and operative when placed in another, an electrically energized member mechanically actuated by said movable member, two conductive members so positioned that the energized member will contact with one when said movable member is in the first position mentioned and with the other when it is in the second, electrical connection from the first-mentioned conductive member to mechanism adapted to actuate the automatic control means and from the other to means adapted to return the automatic control means to its neutral position.

9. In bank control mechanism, means adapted to automatically render the rate of change of the angle of bank proportional to the side slip of the craft, said means including an element positioned by a vane adapted to automatically align itself parallel to the direction of fluid flow with respect to the vane, a member adapted to reversibly control the actuation of the banking mechanism, and means connecting said member to the banking mechanism in such a manner as to move the member with respect to the above mentioned element by amounts proportional to the movements of the banking mechanism.

10. In an airplane the combination of ailerons and means adapted to automatically position the ailerons at inclinations to their neutral positions approximately proportional to the lateral movement of the airplane with respect to the air, said means including a contact arm positioned by a vane rotatably displaced about a normally vertical axis so as to maintain its central axis parallel to the line of the air stream, two contact members adapted to reversibly actuate the ailerons upon contacting with the contact arm, and a member connected to one of the ailerons and adapted to displace the insulated junction of the two contact members in proportion to the movement of the aileron.

11. In aircraft the combination of an aileron, a vane automatically maintained parallel to the airstream, and means for positioning the aileron controlled by the vane and by a member moved in unison with the aileron.

12. In aircraft, a vane adapted to be angularly displaced by side slip of the craft in amounts equal to the corresponding angular displacement of the airstream and means controlled thereby for banking the craft at a rate proportional to the side slip.

13. In a vehicle adapted to move through a fluid medium a member adapted to align itself parallel to the line of motion of the fluid with respect to the member, and means controlled by said member for producing rotary displacements of the vehicle at rates substantially proportional to the contemporary displacements of the first mentioned member.

14. In a vehicle adapted to move through a fluid medium, a member adapted to be angularly displaced by lateral movements of the vehicle with respect to the medium through an angle whose tangent is the rate of lateral movement of the member with respect to the medium divided by the corresponding rate of longitudinal movement, and means controlled thereby for producing controlling effects on the vehicle substantially proportional to the lateral component of the velocity of the vehicle with respect to the medium.

15. In a vehicle, two independently movable means for controlling the vehicle and an autonomous member adapted to selectively bring either means to its neutral position.

16. In a vehicle, manual means for controlling the vehicle, automatic means for controlling it, and an autonomous member adapted to selectively bring either means to its neutral position.

17. In aircraft the combination of a member automatically maintained parallel to the airstream, and means controlled by said member for banking the craft.

18. In aircraft the combination of means for banking the craft, an airstream deflected approximately equally with each equal increment of side-slip, a vane automatically aligned parallel to said airstream, and mechanism controlled thereby for actuating the first named means.

19. In an aircraft the combination of an airstream making an angle with the axis of the aircraft selectively governed in direction and amount by the direction and amount of side-slip existing, a vane supported so as to be rotatable about a normally vertical axis to align itself with said airstream, control means for banking the craft, and mechanism controlled by the vane for actuating said means.

20. In an aircraft the combination of a vane rotatable with respect to a normally vertical axis to automatically align itself parallel to the airstream, and means controlled thereby for banking the craft.

21. In an aircraft the combination of a vane rotatable with respect to a normally vertical axis to automatically align itself with its central axis parallel to the lines of airflow with respect to it, means for banking the craft, and means controlled by the vane for actuating said banking means.

22. In a vehicle the combination of means for controlling rotary movements of the vehicle, mechanism for selectively actuating said means by either of two actuators, an autonomous member for selectively rendering either actuator operative and the other inoperative, and means controlled by said member for restraining the inoperative actuator in a fixed position.

23. In a vehicle the combination of means for directly controlling rotary movements of the vehicle, a movable member capable of selective operation to either render said means operative or to restrain it in neutral, means for automatically controlling the same movements of the vehicle, and mechanism for automatically rendering said last named means operative when the movable member is moved into the position in which it restrains the first named means in neutral.

24. In an aircraft the combination of control surfaces, a manually operable member controlling the operation of same, means for varying the relative amounts of movement of the member and the control surfaces, means for automatically controlling the operation of the control surfaces, and mechanism for automatically rendering said last named means operative when the movement of the control surfaces relative to the manually operable member reaches a predetermined minimum.

25. In a vehicle the combination of manual means and of automatic means for effecting rotary movements of the vehicle, a selector adapted to be selectively positioned to render either means operative and the other means inoperative, and mechanism automatically operative to bring the inoperative means to neutral.

26. In aircraft the combination of means for effecting rotary movements of the craft, manual control means for controlling same, automatic control means for controlling same, a movable member for selectively rendering the manual means operative or inoperative, and mechanism controlled by said member for returning the automatic control means to neutral when the manual control means are rendered operative.

27. In aircraft the combination of bank control mechanism, a vane automatically rotatable about a normally vertical axis to align itself parallel to the airstream, an element positioned thereby, a member controlling the actuation of the banking mechanism, and means for moving said member with respect to said element by amounts proportional to the movements of the banking mechanism.

28. In aircraft the combination of means for effecting rotary displacements of the craft, a vane automatically aligned with its central axis parallel to the airstream, and means controlled thereby for actuating the first named means.

29. In a device of the class described, two actuators, a cord connecting same and passing over a movable pulley between the two actuators, and a member for selectively rendering either actuator operative and simultaneously holding the other actuator in a fixed position.

30. In a vehicle two independently movable elements for controlling the vehicle, a member displaced in response to the resultant of the movement of said two elements, and means automatically operative to hold one element substantially stationary while the other element is actuating the member.

31. In a vehicle two independently movable elements for controlling the vehicle, control means displaced in response to the resultant of the movement of said two elements, and a movable member for selectively rendering either element operative and holding the other element in a fixed position.

32. In a vehicle two independently movable elements for controlling the vehicle, control means displaced in response to the resultant of the movement of said two elements, and a member for rendering one element operative and holding the other element in a fixed position.

33. In a vehicle two independently movable elements for controlling the vehicle, control means displaced in response to the resultant of the movement of said two elements, and a member for selectively rendering either element operative and returning the other element to its neutral position.

34. In a vehicle two independently movable elements for controlling the vehicle, control means displaced in response to the resultant of the movement of said two elements, a member for rendering one of said elements operative, and mechanism controlled by said member for returning the other element to a predetermined position.

35. In a vehicle manually operable mechanism for controlling the vehicle, automatically operated mechanism for controlling it, a member moved in response to the resultant of the movement of said two controlling mechanisms, and means automatically operative to hold one element substantially stationary while the other element is actuating the member.

In testimony whereof I affix my signature

HAROLD T. AVERY.